UNITED STATES PATENT OFFICE.

SAMUEL J. WHITING, OF PHILADELPHIA, PENNSYLVANIA.

IMPROVEMENT IN PAVING-BLOCKS.

Specification forming part of Letters Patent No. 178,982, dated June 20, 1876; application filed December 6, 1875.

*To all whom it may concern:*

Be it known that I, SAMUEL J. WHITING, of the city and county of Philadelphia, and State of Pennsylvania, have invented a new and useful Composition for Roadways, &c.; and I do hereby declare the following to be a clear and exact description of the nature thereof, sufficient to enable others skilled in the art to which my invention appertains to fully understand, make, and use the same.

My invention consists in forming roadways or pavements of blocks of compressed masses of granulated granite, sharp sand, oil, black rosin, and natural bitumen; and in forming the same I proceed as follows: First, the granulated granite and sand are heated so as to expel moisture, care being taken that the heat does not exceed 200°; then add bitumen and rosin in a pulverized state, and while they are being well mixed pour in gradually the oil, the proper temperature of heat being retained, so that the mass will be thoroughly incorporated.

The proportions are as follows: Granite, eighty-five per cent.; sand, two and one-half per cent.; oil, two and one-half per cent.; rosin, two per cent.; bitumen, eight per cent.

The granite should be granulated to the size of grains of rice, and bolted to be free of dust.

Rosin-oil and residuum from petroleum are the best oil for my purpose, and fully the above percentage can be used for paving-blocks, it rendering the compound elastic without being soft, while it retains sufficient hardness to withstand the passage of heavy vehicles and animals.

The bitumen should be ground as fine as possible, and not larger than half-ounce pieces. Crude Trinidad is the best. The natural elasticity of bitumen is often destroyed by heat; therefore crude bitumen is employed; and care is necessary in mixing it with the stone that the heat does not exceed 200°, as stated.

The cylinder or mixer may rest on a fire-box, or be incased in a steam-jacket.

After the mass is thoroughly incorporated it is run into molds (rapidly to prevent chilling) and subjected to powerful pressure.

The molds should be coated with whitewash, so as to have a surface of lime, whereby adhesion of the mass to the sides of the mold is prevented. The blocks are then removed from the molds, and, if desired, immersed in cold water, so as to be hardened, this immediately rendering the blocks ready for use or storage.

Having thus described my invention, what I claim as new, and desire to secure by Letters Patent, is—

Roadway-blocks formed of compressed masses of granulated granite, sharp sand, oil, black rosin, and natural bitumen, combined as herein set forth, and for the purpose specified.

SAML. J. WHITING.

Witnesses:
 JOHN A. WIEDERSHEIM,
 A. P. GRANT.